(12) United States Patent
Hoshino et al.

(10) Patent No.: US 11,396,123 B2
(45) Date of Patent: Jul. 26, 2022

(54) LIQUID CONTAINER MANUFACTURING METHOD

(71) Applicant: YOSHINO KOGYOSHO CO., LTD., Tokyo (JP)

(72) Inventors: Hideaki Hoshino, Tokyo (JP); Shinichi Tabata, Tokyo (JP); Yuichi Okuyama, Tokyo (JP); Shigeki Morikami, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 316 days.

(21) Appl. No.: 16/604,525

(22) PCT Filed: Jan. 23, 2018

(86) PCT No.: PCT/JP2018/001932
§ 371 (c)(1),
(2) Date: Oct. 10, 2019

(87) PCT Pub. No.: WO2018/198449
PCT Pub. Date: Nov. 1, 2018

(65) Prior Publication Data
US 2020/0156302 A1 May 21, 2020

(30) Foreign Application Priority Data

Apr. 27, 2017 (JP) .............................. JP2017-088890
Jun. 29, 2017 (JP) .............................. JP2017-127253

(51) Int. Cl.
*B29C 49/12* (2006.01)
*B29C 49/46* (2006.01)
*B29L 31/00* (2006.01)

(52) U.S. Cl.
CPC .............. *B29C 49/12* (2013.01); *B29C 49/46* (2013.01); *B29C 2049/465* (2013.01); *B29L 2031/7158* (2013.01)

(58) Field of Classification Search
None
See application file for complete search history.

(56) References Cited

U.S. PATENT DOCUMENTS

2013/0113143 A1   5/2013   Fevre et al.
2015/0076105 A1   3/2015   Sato et al.
(Continued)

FOREIGN PATENT DOCUMENTS

CN   103003051 A   3/2013
CN   104684708 A   6/2015
(Continued)

OTHER PUBLICATIONS

Feb. 2, 2021 Office Action issued in Chinese Patent Application No. 201880025323.2.
(Continued)

*Primary Examiner* — Robert J Grun
(74) *Attorney, Agent, or Firm* — Oliff PLC (57) ABSTRACT

A liquid container manufacturing method includes: a nozzle fitting step of fitting a blow nozzle into a mouth of a preform; a liquid replacing step of replacing the air in the preform with a liquid by supplying a predetermined amount of liquid from a liquid supply port to the preform with a discharge port open; and a liquid blow molding step of molding the preform into a liquid container by supplying a pressurized liquid from the liquid supply port into the preform after the discharge port is closed.

9 Claims, 9 Drawing Sheets

(56) References Cited

U.S. PATENT DOCUMENTS

2015/0246475 A1  9/2015  Suyama et al.
2017/0008216 A1  1/2017  Suyama et al.
2017/0021553 A1  1/2017  Kharchenko et al.

FOREIGN PATENT DOCUMENTS

JP    2009-533290 A    9/2009
JP       5806929 B2   11/2015
JP    2016-165907 A    9/2016

OTHER PUBLICATIONS

Oct. 29, 2019 International Preliminary Report on Patentability issued in International Patent Application No. PCT/JP2018/001932.
Feb. 27, 2018 International Search Report issued in International Patent Application No. PCT/JP2018/001932.
Nov. 30, 2020 Extended Search Report issued in European Patent Application No. 18791682.0.
Jan. 19, 2021 Office Action issued in Japanese Patent Application No. 2017-127253.
Oct. 27, 2021 Office Action issued in Chinese Patent Application No. 201880025323.2.

LIQUID CONTAINER MANUFACTURING METHOD

TECHNICAL FIELD

The present disclosure relates to a method of manufacturing a liquid container that contains a content liquid from a synthetic resin preform.

BACKGROUND

Synthetic resin containers, typical examples of which are polypropylene (PP) bottles and polyethylene terephthalate (PET) bottles, are used for applications in which a variety of liquids such as beverages, cosmetic products, pharmaceutical products, detergents and toiletries including shampoo are contained as a content liquid. Such a container is generally manufactured by blow molding a preform formed by the above described thermoplastic resin material.

As a blow molding in which a preform is molded into a container, the liquid blow molding is known in which, as a pressurizing medium supplied into a preform, a pressurized liquid is used instead of pressurized air.

For example, PTL 1 discloses a liquid blow molding method in which a synthetic resin preform that is heated in advance to a temperature at which stretchability is achieved is placed into a mold for blow molding and a liquid pressurized to a predetermined pressure by a pump is supplied into the preform through a blow nozzle. In this manner a preform is molded into a container of a predetermined shape conforming to a cavity of the mold for blow molding.

In the above described liquid blow molding method, as a liquid supplied into a preform, a content liquid such as beverage contained finally in a container as a product is used, and molding of a container and filling of a content liquid are performed at the same time. In this manner a liquid container containing a content liquid can be manufactured. Therefore, according to the liquid container manufacturing method using the liquid blow molding described above, a step of filling a content liquid into a container after molding is omitted, and a liquid container can be manufactured at a low cost.

CITATION LIST

Patent Literature

PTL 1: JP5806929 B2

SUMMARY

Technical Problem

In the liquid blow molding, since a liquid as a pressurized medium is supplied into a preform while catching the air present in the preform, it is likely that a problem of reduction in stability of molding conditions and moldability of a container may occur.

The present disclosure has been conceived in view of the above described problem, and is to provide a liquid container manufacturing method by which a liquid container having a predetermined capacity and a shape can be precisely manufactured at a low cost.

Solution to Problem

The disclosed liquid container manufacturing method is a liquid container manufacturing method for manufacturing a liquid container containing a content liquid from a synthetic resin preform. The method includes: a nozzle fitting step of fitting a blow nozzle into a mouth of the preform placed in a mold for blow molding; a liquid replacing step of replacing air in the preform with a liquid by supplying a predetermined amount of liquid into the preform from a liquid supply port provided to the blow nozzle separately from a discharge port with the discharge port provided to the blow nozzle open; and a liquid blow molding step of molding the preform into a liquid container having a shape conforming to an inner surface of the mold for blow molding by supplying a pressurized liquid from the liquid supply port into the preform after the discharge port is closed.

According to the disclosed liquid container manufacturing method, in the above described configuration, it is preferable that, in the liquid replacing step, a predetermined amount of liquid is supplied into the preform at a pressure lower than that of the liquid blow molding step.

According to the disclosed liquid container manufacturing method, in the above described configuration, it is preferable that the method includes: before or during the liquid blow molding step, a rod stretching step of axially stretching the preform by a stretching rod; and, after the liquid blow molding step, a rod pulling step of separating the stretching rod from the liquid container.

According to the disclosed liquid container manufacturing method, in the above described configuration, it is preferable that the method further includes: after the liquid blow molding step, a liquid discharging step of discharging a predetermined amount of liquid from the liquid container after molding through the liquid supply port; and a headspace forming step of forming a predetermined amount of headspace in the liquid container by separating the blow nozzle from the mouth of the liquid container after a predetermined amount of liquid is discharged therefrom.

According to the disclosed liquid container manufacturing method, in the above described configuration, it is preferable that the liquid discharging step is performed by sucking back a predetermined amount of liquid from the liquid container after molding through the liquid supply port.

According to the disclosed liquid container manufacturing method, in the above described configuration, it is preferable that the method includes a rod insertion step of inserting a rod member into the preform before the liquid replacing step, and the liquid replacing step is performed to the preform into which the rod member is inserted in the rod insertion step.

According to the disclosed liquid container manufacturing method, in the above described configuration, it is preferable that, in the rod insertion step, the rod member is inserted into the preform until it occupies 30% to 70% of the internal volume of the preform.

According to the disclosed liquid container manufacturing method, in the above described configuration, it is preferable that the rod member is a stretching rod that axially stretches the preform.

According to the disclosed liquid container manufacturing method, in the above described configuration, it is preferable that, by adjusting an opening of a seal body that opens/closes the liquid supply port, an effective cross-sectional area of the liquid supply port when a liquid is supplied into the preform in the liquid replacing step is determined to be 10% or less of that of the liquid supply port when a pressurized liquid is supplied into the preform in the liquid blow molding step.

Advantageous Effect

According to the present disclosure, a liquid container manufacturing method of enabling precise manufacturing of a liquid container having a predetermined capacity and a shape at a low cost can be provided.

DETAILED DESCRIPTION

The present disclosure will be described in more detail below with reference to the drawings.

A liquid container manufacturing method according to an embodiment of the present disclosure is a liquid container manufacturing method of manufacturing a liquid container containing a content liquid from a synthetic resin preform. The method includes a nozzle fitting step of fitting a blow nozzle into a mouth of a preform placed in a mold for blow molding; a liquid replacing step of replacing the air in the preform with a liquid by supplying a predetermined amount of liquid into the preform from a liquid supply port provided to a blow nozzle separately from a discharge port with the discharge port provided to the blow nozzle open; and a liquid blow molding step of molding the preform into a liquid container having a shape conforming to an inner surface of the mold for blow molding by supplying a pressurized liquid into the preform from the liquid supply port after the discharge port is closed.

According to the liquid container manufacturing method of the present embodiment, in the liquid replacing step, a predetermined amount of liquid is supplied into the preform at a pressure that is lower than that in the liquid blow molding step.

The liquid container manufacturing method according to the present embodiment includes a rod stretching step of axially stretching the preform by a stretching rod during the liquid blow molding step and a rod pulling step of separating the stretching rod from the liquid container after the liquid blow molding step.

The liquid container manufacturing method according to the present embodiment further includes a liquid discharging step of discharging, after the liquid blow molding step, a predetermined amount of liquid from a liquid container after molding through a liquid supply port and a headspace forming step of forming a predetermined amount of headspace in the liquid container by separating the blow nozzle from the mouth of the liquid container after a predetermined amount of liquid is discharged therefrom.

In the liquid container manufacturing method according to the present embodiment, the liquid discharging step is performed by sucking back a predetermined amount of liquid from the liquid container after molding through the liquid supply port.

Figure 1:
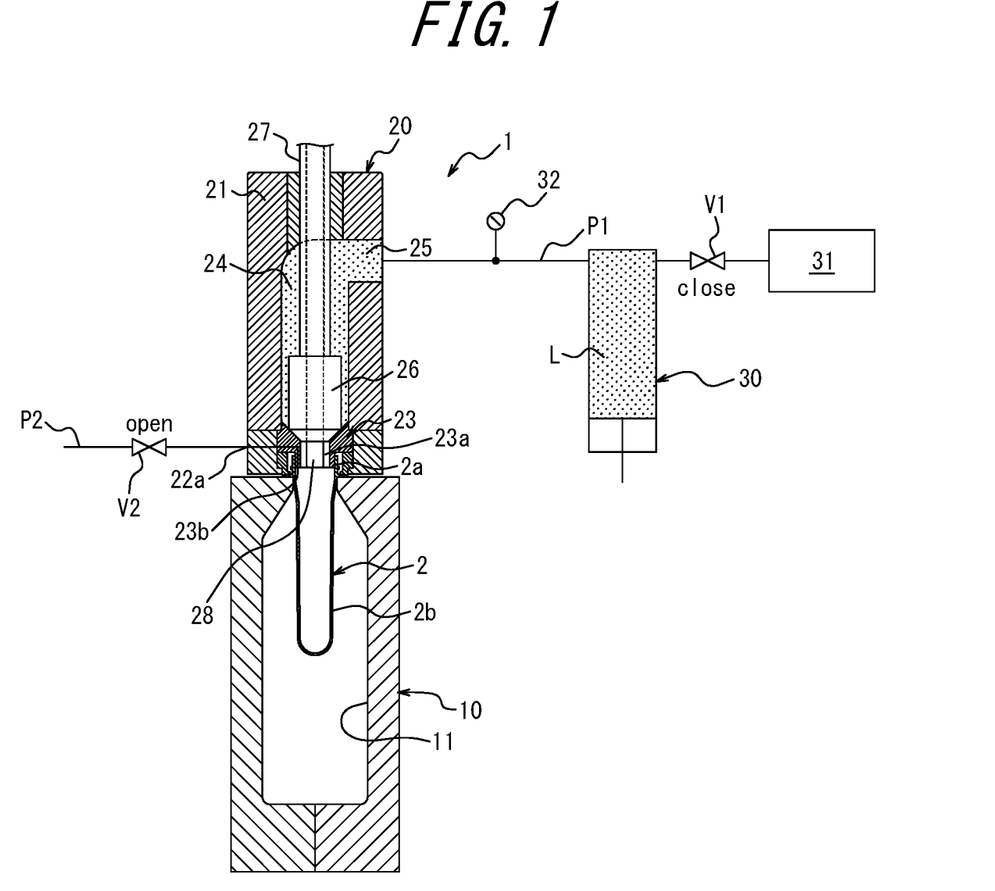
FIG. 1 is a diagram illustrating an example of a liquid container manufacturing apparatus used for a liquid blow molding method according to an embodiment of the present disclosure.

The above described liquid container manufacturing method according to the present disclosure can be performed by using a liquid container manufacturing apparatus 1 configured as illustrated in FIG. 1, for example.

The liquid container manufacturing apparatus 1 illustrated in FIG. 1 manufactures a liquid container C containing a content liquid from a synthetic resin preform 2. As the liquid (content liquid) L contained in the liquid container C, a variety of liquids L such as, for example, beverages, cosmetic products, pharmaceutical products, detergents and toiletries including shampoo can be adopted.

As the preform 2, those formed, by a thermoplastic synthetic resin material such as polypropylene (PP) and polyethylene terephthalate (PET), for example, into a bottomed cylindrical shape that includes a cylindrical mouth 2a, which is an open end, and a cylindrical barrel portion 2b that is connected to the mouth 2a and has a closed lower end may be used.

Although not illustrated in detail, on the outer wall surface of the mouth 2a is provided with a fitting protrusion configured to mount a closing cap (not illustrated) to the mouth 2a of the liquid container C after molding by plugging (undercut fitting). Note that, on the outer wall surface of the mouth 2a may be provided with, instead of the fitting protrusion, a male thread so that the closing cap is mounted to the mouth 2a by thread connection.

The liquid container manufacturing apparatus 1 has a mold for blow molding 10. The mold for blow molding 10 includes a cavity 11 having a shape corresponding to a final shape of the liquid container C such as a bottle shape. The cavity 11 opens upward on the upper surface of the mold for blow molding 10. The preform 2 is placed in the mold for blow molding 10 with the barrel portion 2b disposed in the cavity 11 of the mold for blow molding 10 and the mouth 2a protruded upward from the mold for blow molding 10.

The mold for blow molding 10 can be opened right and left. After the preform 2 is molded into a liquid container C, the liquid container C can be ejected from the mold for blow molding 10 by opening the mold right and left.

Above the mold for blow molding 10 is provided with a nozzle unit 20 configured to supply a pressurized liquid L into the preform 2. The nozzle unit 20 has a main body block 21, and the main body block 21 is vertically movable relative to the mold for blow molding 10.

Figure 2:
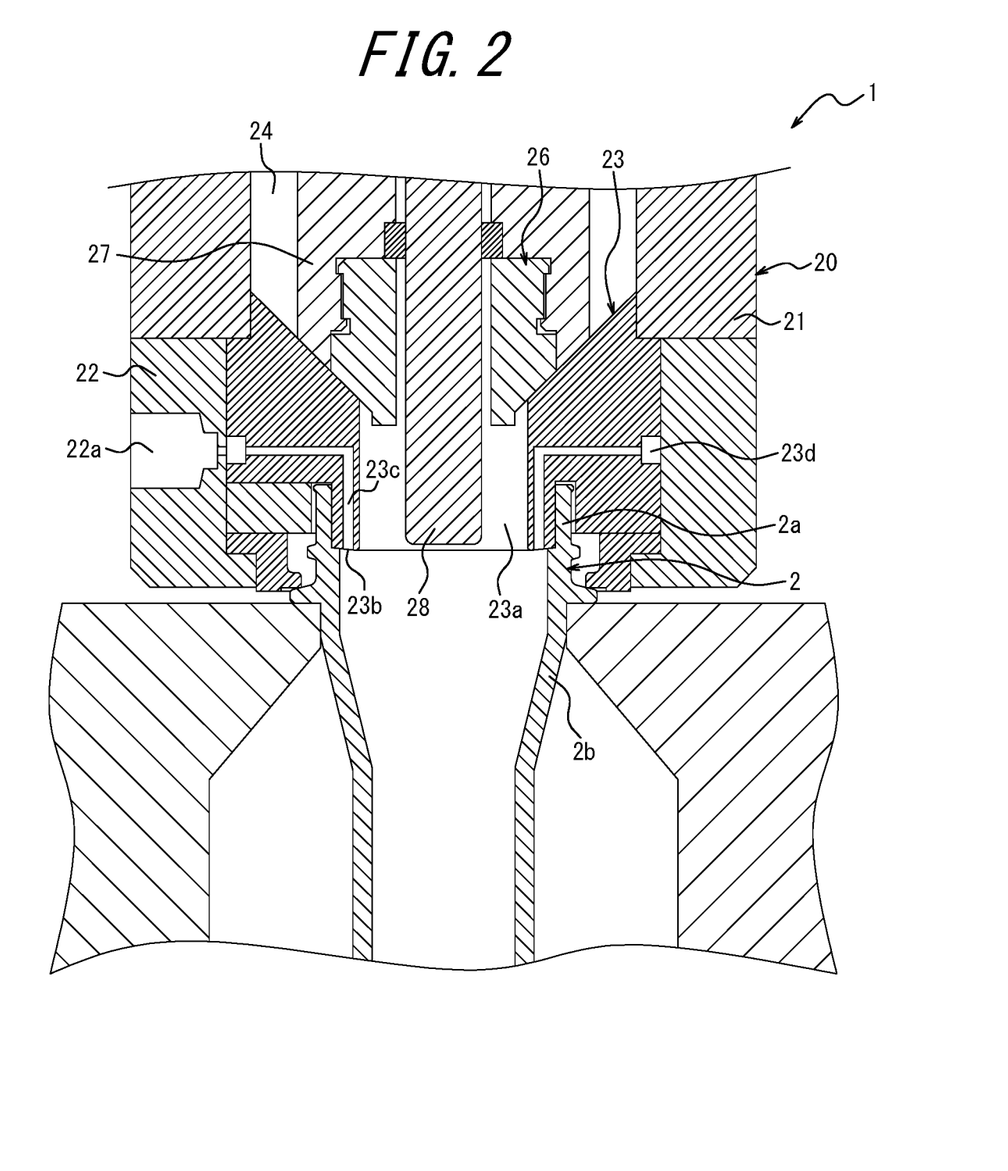
FIG. 2 is a cross-sectional view of a detailed configuration of a main part of a nozzle unit in FIG. 1.

As illustrated in FIG. 2, the lower end of the main body block 21 is provided with a support block 22, and a blow nozzle 23 is mounted to the lower end of the main body block 21 by being supported by the support block 22. The blow nozzle 23 is formed into a substantially cylindrical shape and, when the main body block 21 is lowered to the stroke end on the lower side, fits, in a sealed manner, from above into the mouth 2a of the preform 2 placed in the mold for blow molding 10.

The inside of the cylindrical portion of the blow nozzle 23 is configured as a liquid supply port 23a. Further, the cylindrical portion constituting the liquid supply port 23a of the blow nozzle 23 is provided with a discharge port 23b that opens to the lower end of the cylindrical portion. The discharge port 23b may be provided at the other portion such as a stretching rod 28 described later. In the present embodiment, the cylindrical portion of the blow nozzle 23 is provided with eight discharge ports 23b circumferentially arranged side by side at regular intervals. The number thereof may be changed.

Inside the main body block 21 is provided with a supply channel 24 that extends in the vertical direction. The supply channel 24 is a flow channel configured to supply liquid L to the liquid supply port 23a of the blow nozzle 23, and communicates with the liquid supply port 23a of the blow nozzle 23 at the lower end thereof.

Furthermore, as illustrated in FIG. 1, the main body block 21 is provided with a supply port 25 that communicates with the upper end of the supply channel 24.

Inside the supply channel 24 is provided with a seal body 26 configured to open/close the liquid supply port 23a of the blow nozzle 23. The seal body 26 is fixed to the lower end of a shaft body 27 provided vertically movably to the nozzle unit 20, and is vertically movable in the supply channel 24. The seal body 26 may be formed integrally with the shaft body 27. The seal body 26 is formed into a columnar shape, and comes in contact with the upper surface of the blow nozzle 23 on the lower end surface when it moves to the close position on the lower side, which is a stroke end position, and closes the liquid supply port 23a of the blow nozzle 23. On the other hand, when the seal body 26 moves upward from the close position, the liquid supply port 23a of the blow nozzle 23 is opened and communicated with the supply channel 24.

As illustrated, the liquid container manufacturing apparatus 1 may include a stretching rod 28. The stretching rod 28 is inserted into the shaft center of the shaft body 27 to be vertically movable relative to the shaft body 27, and is retractable from the lower end of the seal body 26 through the shaft center of the seal body 26. The stretching rod 28 is driven downward by a driving source not illustrated and can axially stretch the preform 2.

A pressurized liquid supply source 30 is connected to the supply port 25 through a pipe P1. The pressurized liquid supply source 30 can be constituted by a plunger pump that includes a cylinder 30a and a piston (plunger) 30b, for example.

A supply tank 31 is connected to the pressurized liquid supply source 30. The supply tank 31 may be configured to store the liquid L, heat the liquid L up to a predetermined temperature and hold the liquid L at the temperature. A flow channel between the pressurized liquid supply source 30 and the supply tank 31 is provided with an opening-closing valve 1, and the flow channel can be opened/closed by the opening-closing valve 1. Note that the reference sign 32 represents a pressure gauge provided to the pipe P1.

A plurality of discharge ports 23b provided to the blow nozzle 23 are communicated with a connection channel 23d that is annularly provided on the outer periphery of the blow nozzle 23 through flow channels 23c, each extending upward and bending radially outward. A discharge tank (not illustrated) is connected to the connection channel 23d through a pipe P2 that is connected to a connection port 22a on the side of the support block 22. In other words, each of the discharge ports 23b provided to the blow nozzle 23 is connected to the discharge tank. Note that the pipe P2 may be connected also to a suction pump for discharge instead of the discharge tank. An opening-closing valve V2 is provided to the pipe P2.

The pressurized liquid supply source 30 operates in a positive direction (a pressurized direction) with the seal body 26 moved upward and the liquid supply port 23a open. In this manner, the pressurized liquid supply source 30 can supply liquid L pressurized to a predetermined pressure into the preform 2 through the pipe P1, the supply port 25, the supply channel 24 and the liquid supply port 23a of the blow nozzle 23. Further, the pressurized liquid supply source 30 operates in a reverse direction with the liquid supply port 23a closed by the seal body 26, the opening-closing valve V2 closed and the opening-closing valve 1 open. In this manner, the pressurized liquid supply source 30 can suck the liquid L stored in the supply tank 31 into the cylinder 30a to prepare for the next liquid blow molding. Note that the pressurized liquid supply source 30 may also operate in the reverse direction (a sucking direction) with the liquid supply port 23a opened by the seal body 26 and the opening-closing valves V1 and V2 closed. In this manner the pressurized liquid supply source 30 sucks back the liquid L stored in the liquid container C after molding into the supply channel 24 and discharges the liquid L out of the liquid container C.

Operation of the nozzle unit 20, the seal body 26, the stretching rod 28, the pressurized liquid supply source 30 and the opening-closing valves V1 and V2 and the like are controlled by a controller (not illustrated) in an integrated manner. This control can be made with reference to the values and the like of the pressure gauge 32. It is preferable that the opening-closing valves V1 and V2 are constituted by solenoid valves that can be controlled by the controller.

Next, a method of molding a liquid container C containing a liquid (content liquid) L in a container of a predetermined shape from the synthetic resin preform 2 by using the liquid container manufacturing apparatus 1 configured in the above described manner (a liquid container manufacturing method according to the present embodiment) will be described.

First, a preform 2 heated, by using a heating means (not illustrated) such as a heater, in advance to a predetermined temperature (e.g. from 80° C. to 150° C.) at which stretchability is achieved is placed in the mold for blow molding 10 and is clamped.

Next, the nozzle fitting step is performed. In the nozzle fitting step, the nozzle unit 20 is lowered toward the mold for blow molding 10 to allow the blow nozzle 23 to be fitted into the mouth 2a of the preform 2 in a sealed manner. FIGS. 1 and 2 illustrate a state in which the blow nozzle 23 fits into the mouth 2a of the preform 2. In this state, the seal body 26 and the opening-closing valve 1 are closed, and the opening-closing valve V2 is opened. Further, the stretching rod 28 is held at an original position where it does not protrude downward from the blow nozzle 23.

Figure 3:
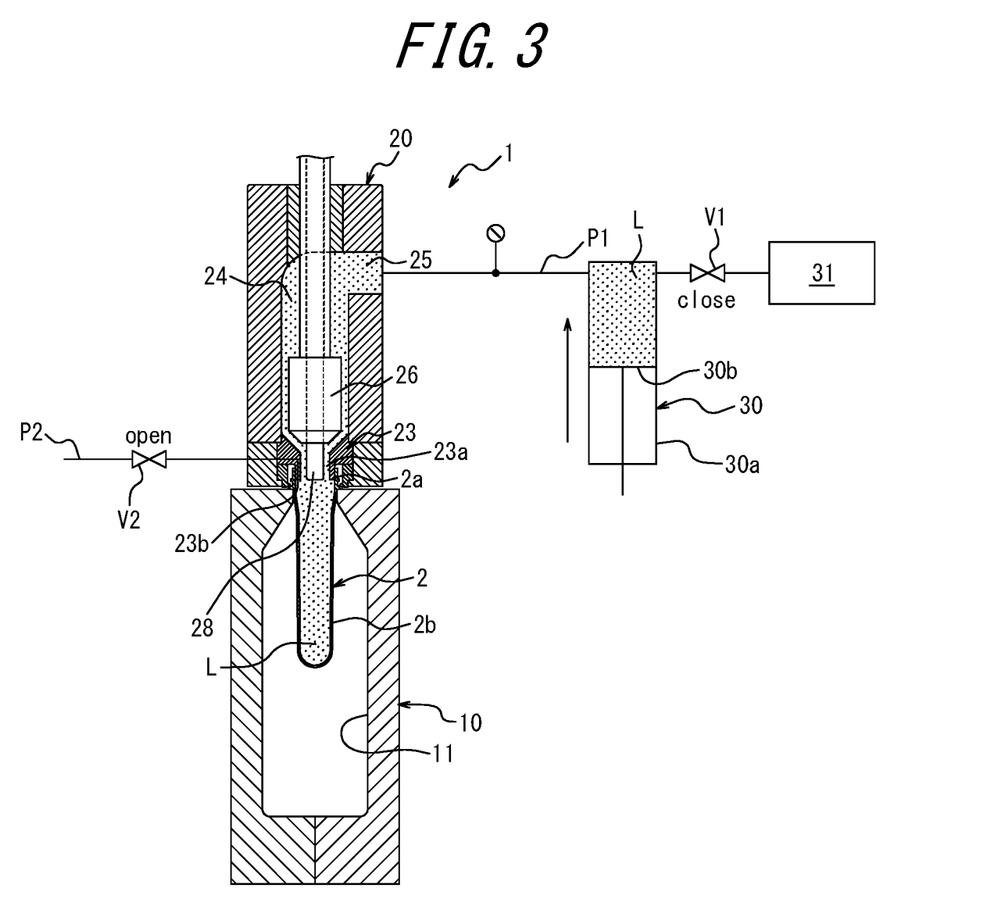
FIG. 3 is a diagram illustrating the liquid container manufacturing apparatus during a liquid replacing step.

Next, as illustrated in FIG. 3, the liquid replacing step is performed. In the liquid replacing step, the seal body 26 is moved upward with the opening-closing valve V2, that is, the discharge port 23b, open, to open the liquid supply port 23a, and in this state the pressurized liquid supply source 30 is operated in the positive direction (pressurized direction). When the pressurized liquid supply source 30 is operated, the liquid L is supplied into the preform 2 through the pipe P1, the supply port 25, the supply channel 24 and the liquid supply port 23a of the blow nozzle 23. At this time, since the discharge port 23b provided to the blow nozzle 23 is opened and is communicated with the discharge tank, when the liquid L is supplied into the preform 2, the air inside the preform 2 is discharged from the discharge port 23*b* to the outside, and the air inside the preform 2 is replaced with the liquid L. That is, in the liquid replacing step, the air inside the preform 2 is replaced with the liquid L, and the preform 2 is filled with the liquid L.

In the liquid replacing step, it is preferable that a predetermined amount of liquid L is supplied into the preform 2 at a pressure that is lower than that used in the liquid blow molding step. That is, in the liquid replacing step, it is preferable that the pressurized liquid supply source 30 is operated at an operating velocity at which the preform 2 is not liquid blow molded or is slightly liquid blow molded.

Further, in the liquid replacing step, it is preferable that, by adjusting the opening of the seal body 26 that opens/closes the liquid supply port 23*a*, the effective cross-sectional area (a cross-sectional area of an annular flow channel through which the liquid L flows) of the liquid supply port 23*a* when the liquid L is supplied into the preform 2 in the liquid replacing step is determined to be 10% or less of the effective cross-sectional area of the liquid supply port 23*a* when a pressurized liquid L is supplied into the preform 2 in the liquid blow molding step described later.

In this manner, when the liquid L is supplied into the preform 2 through the liquid supply port 23*a* in the liquid replacing step, backflow of the air in the preform 2 into the supply channel 24 through the liquid supply port 23*a* can be prevented. In this manner, in the subsequent liquid blow molding step, the liquid L mixed with the air is prevented from being supplied into the preform 2, and the preform 2 can be molded into a liquid container C more precisely in the liquid blow molding step.

Figure 4:
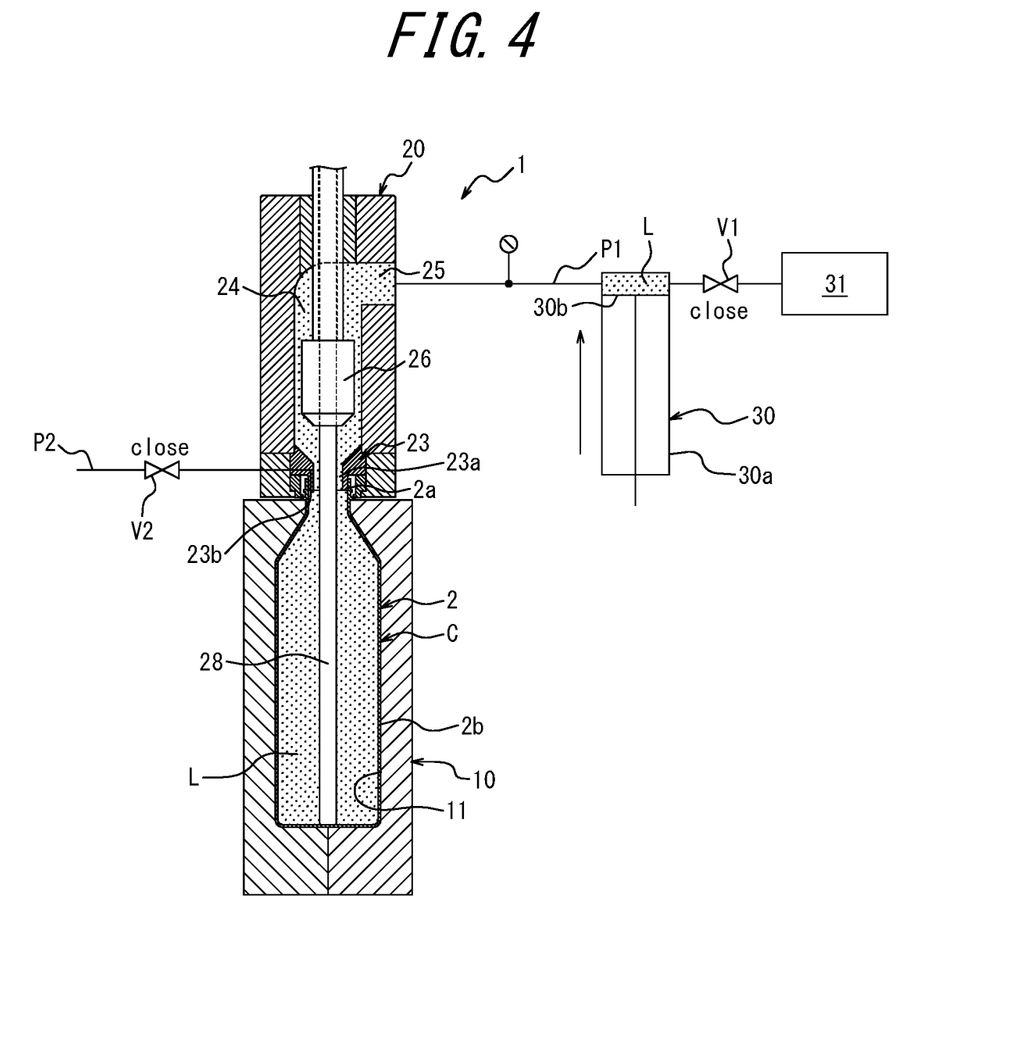
FIG. 4 is a diagram illustrating the liquid container manufacturing apparatus during a rod stretching step and a liquid blow molding step.

When the liquid replacing step is finished, the liquid blow molding step is performed, as illustrated in FIG. 4, after the opening-closing valve V2 is closed. In the liquid blow molding step, the pressurized liquid supply source 30 is operated further in the positive direction with the opening-closing valves V1 and V2 closed, the seal body 26 raised and the liquid supply port 23*a* open. In this case, the pressurized liquid supply source 30 is operated at a velocity at which the pressure of the liquid L supplied to the preform 2 will be a predetermined pressure at which the preform 2 can be liquid blow molded. In this manner, a pressurized liquid L is further supplied into the preform 2 filled with liquid L, and the preform 2 is molded, by the pressure of liquid L, into a liquid container C of a predetermined shape conforming to the inner surface of the cavity 11 of the mold for blow molding 10.

Further, the rod stretching step is also performed during the liquid blow molding step. In the rod stretching step, the stretching rod 28 is moved downward, and the barrel portion 2*b* of the preform 2 is axially (longitudinally) stretched by the stretching rod 28. When the rod stretching step is performed during the liquid blow molding step, a biaxial stretch blow molding can be performed in which a liquid blow molding is performed while the preform 2 is axially stretched by the stretching rod 28. In this manner a preform 2 can be molded into a liquid container C of a predetermined shape more precisely.

Figure 5:
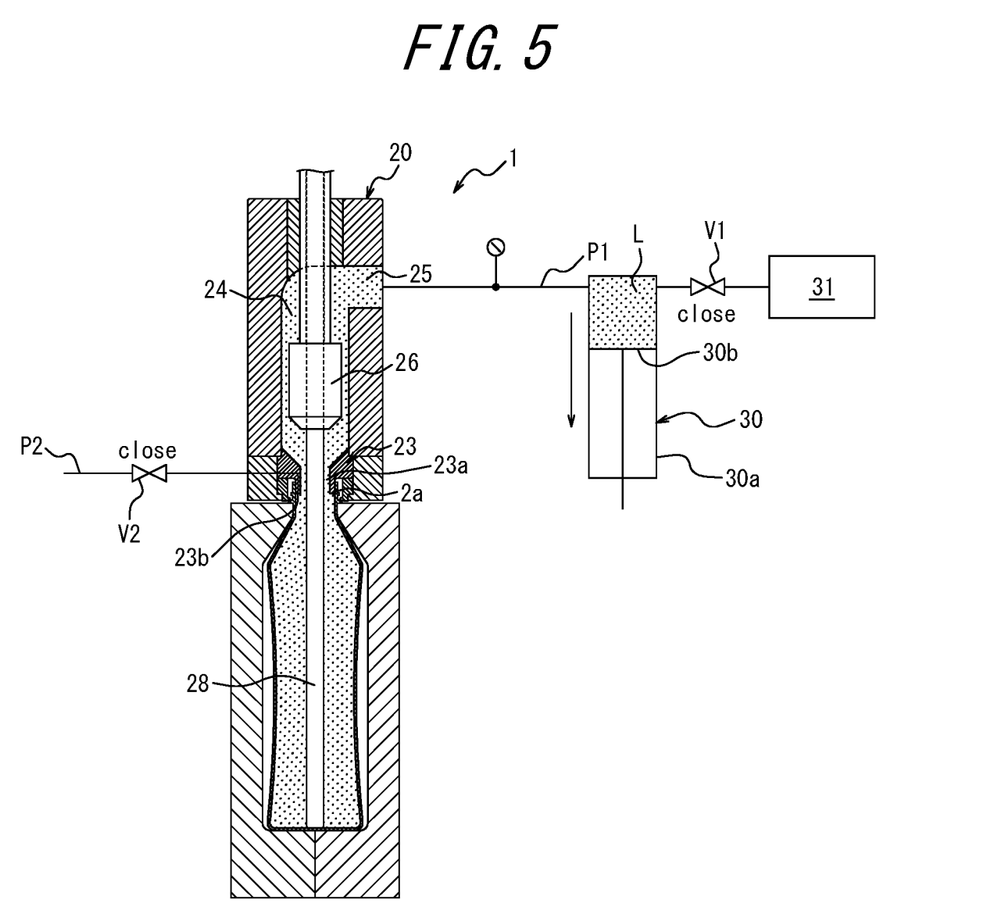
FIG. 5 is a diagram illustrating the liquid container manufacturing apparatus during a liquid discharging step.

In the present embodiment, as illustrated in FIG. 5, the liquid discharging step is performed after a liquid container C is molded in the liquid blow molding step. In the liquid discharging step, the seal body 26 is raised to open the liquid supply port 23*a*, the pressurized liquid supply source 30 is operated in the reverse direction (sucking direction) by a predetermined operating amount with the liquid supply port 23*a* open and the opening-closing valves V1 and V2 closed, and a predetermined amount of liquid is sucked back from the liquid container C after molding into the supply channel 24. By the above described suck back, a predetermined amount of liquid L can be discharged out of the liquid container C after molding. At this time, in the liquid replacing step, the preform 2 is entirely filled with the liquid L and mixing of the air into the liquid L is suppressed. Thus, even if the liquid L is sucked back from the liquid container C into the supply channel 24, deterioration of moldability will not occur in the subsequent liquid blow molding step. The amount of liquid L to be discharged out of the liquid container C in the liquid discharging step is set in consideration of a headspace HS provided in a finished liquid container C.

When a predetermined amount of liquid L is discharged to the outside, the barrel portion of the liquid container C is dented.

Note that, in the liquid discharging step, in addition to the above described suck back, the liquid L in a liquid container C can be discharged to the outside by squeezing the barrel portion of the liquid container C such that it is dented, by using a pressing member, for example, that protrudes from the inner surface of the mold for blow molding 10.

Figure 6:
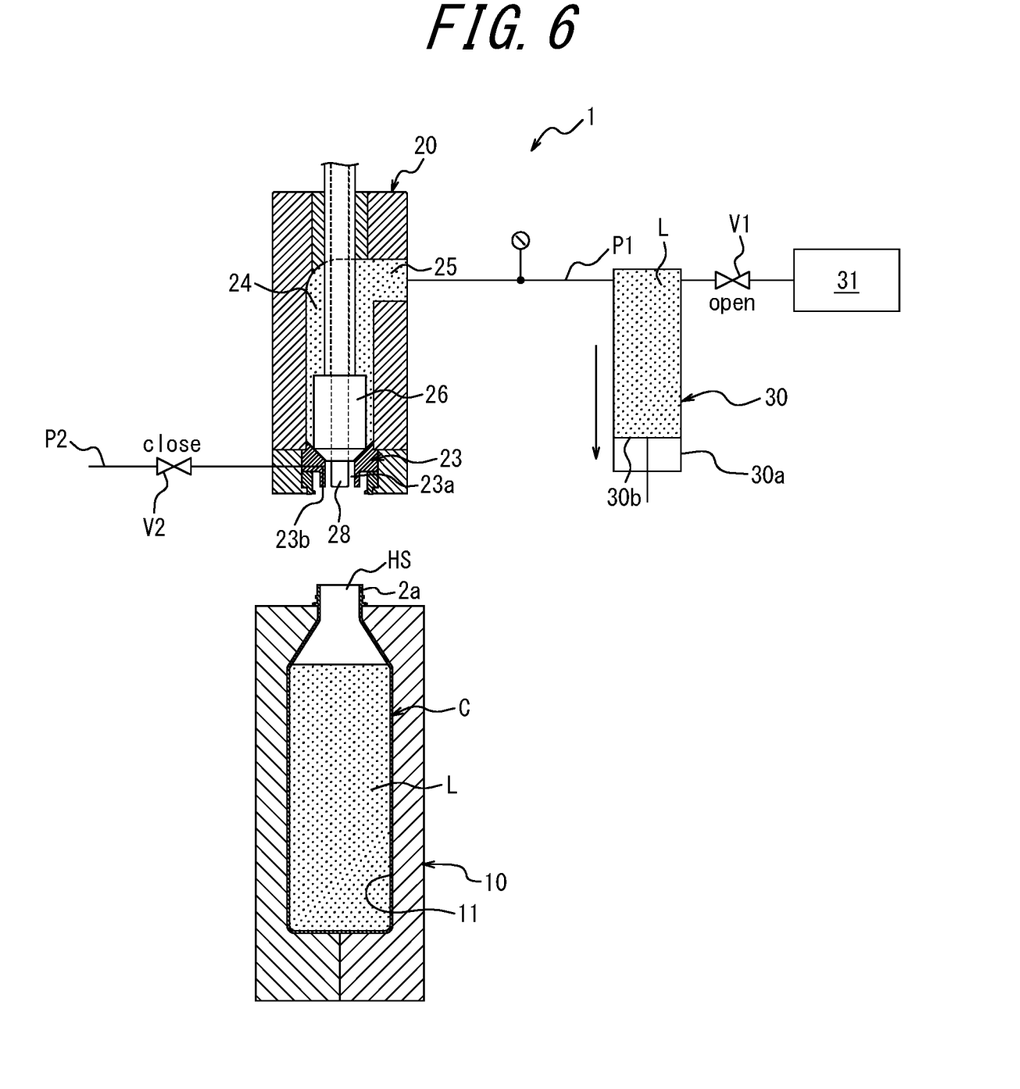
FIG. 6 is a diagram illustrating the liquid container manufacturing apparatus during a headspace forming step after a rod pulling step.

In the present embodiment, after the liquid discharging step is finished and the rod pulling step in which the stretching rod 28 is moved upward to be separated from the liquid container C is performed, the headspace forming step is performed as illustrated in FIG. 6. In the headspace forming step, after the liquid supply port 23*a* is closed by the seal body 26, the nozzle unit 20 is moved upward relative to the mold for blow molding 10. Thus the blow nozzle 23 is separated from the mouth 2*a* of the liquid container C after a predetermined amount of liquid L is discharged therefrom. In this manner, the negative pressure in the liquid container C is released, and a predetermined amount of headspace is formed in the liquid container C.

Note that, in the rod pulling step, when the stretching rod 28 is pulled out of the liquid container C and is separated therefrom, a headspace HS in the liquid container C is increased by the amount of the stretching rod 28 pulled out. Therefore, when the rod stretching step and the rod pulling step are performed, the amount of liquid L to be discharged out of the liquid container C in the liquid discharging step is set in consideration of the amount of the headspace HS formed by pulling of the stretching rod 28. In this manner, a desired amount of headspace HS is formed in a finished liquid container C.

Manufacture of a liquid container C is finished through the above described steps. A finished liquid container C is ejected from the mold for blow molding 10 by opening the mold and a closing cap is attached to the mouth 2*a* thereof to be provided as a product. At this time, the pressurized liquid supply source 30 is operated in the reverse direction and the liquid L stored in the supply tank 31 is sucked into the cylinder 30*a*. Note that the liquid container C may be ejected from the mold for blow molding 10 by opening the mold after a closing cap is attached to the mouth 2*a*.

In the present embodiment, after a liquid container C is molded by the liquid blow molding step, the liquid discharging step and the headspace forming step are performed, and after that the mold for blow molding 10 is opened to eject a finished liquid container C from the mold for blow molding 10. However, after the liquid blow molding step is finished, a liquid container C after molding may be ejected without conducting the liquid discharging step and the headspace forming step, and in this manner manufacture of a liquid container C may be finished. In this case, although a headspace HS is provided in the liquid container C by the amount of the stretching rod 28 pulled out, when the rod stretching step and the rod pulling step are not performed, a headspace HS may not be provided in the liquid container C.

As described above, in the liquid container manufacturing method according to the present embodiment, before the liquid blow molding step, the air in the preform 2 is discharged to the outside through the discharge port 23b to replace the air inside the preform 2 with the liquid L in the liquid replacing step. Thus, even if a pressurized liquid L is supplied into the preform 2 in the liquid blow molding step, the air will not mixed into the liquid L. Therefore, a decline in the stability of molding conditions and moldability of a container due to bubbling of the liquid L or the like is prevented during liquid blow molding, and a liquid container C having a predetermined capacity and a shape can be precisely manufactured at a low cost.

In the liquid container manufacturing method according to the present embodiment, in the liquid replacing step, a predetermined amount of liquid L is supplied into the preform 2 at a pressure that is lower than that of the liquid blow molding step. Thus the air in the preform 2 can be replaced with the liquid L without causing bubbles or the like in the liquid L.

Furthermore, in the liquid container manufacturing method according to the present embodiment, the liquid discharging step is performed after the liquid blow molding step. Thus, even when a predetermined amount of headspace HS is provided in a liquid container C after molding, a headspace HS can be formed in a liquid container C without causing bubbles in the liquid L in the supply channel 24 of the nozzle unit 20. In this manner, a liquid container C having a predetermined capacity and a shape can be manufactured precisely at a low cost without causing a problem such as a lack of an amount of liquid L to be filled into the liquid container C due to a liquid L containing a lot of bubbles taken in the supply channel 24 and an unstable filling pressure during the liquid blow molding causing a decline in moldability of a container, or without causing wasteful liquid L containing air bubbles to be discharged to the outside through the supply channel 24 and a step thereof.

Moreover, in the liquid container manufacturing method according to the present embodiment, the liquid discharging step is performed by sucking back a predetermined amount of liquid L from the liquid container C by operating the pressurized liquid supply source 30 in the reverse direction. Thus the liquid discharging step can be performed without separately providing a mechanism to discharge the liquid L. In this manner, the configuration of the liquid container manufacturing apparatus 1 is simplified and the manufacturing cost of the liquid container C can be reduced.

Figure 7:
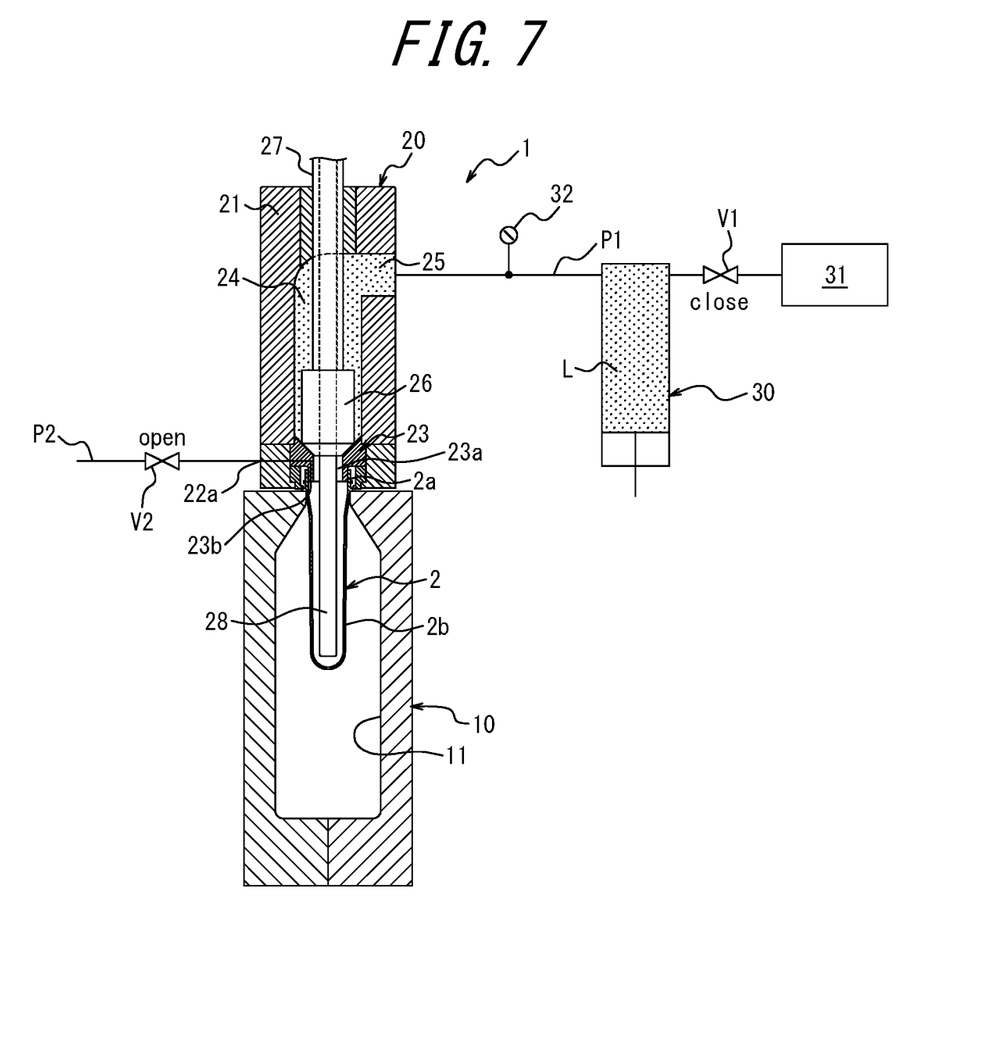
FIG. 7 is a diagram illustrating the liquid container manufacturing apparatus during a rod insertion step before the liquid replacing step.
Figure 8:
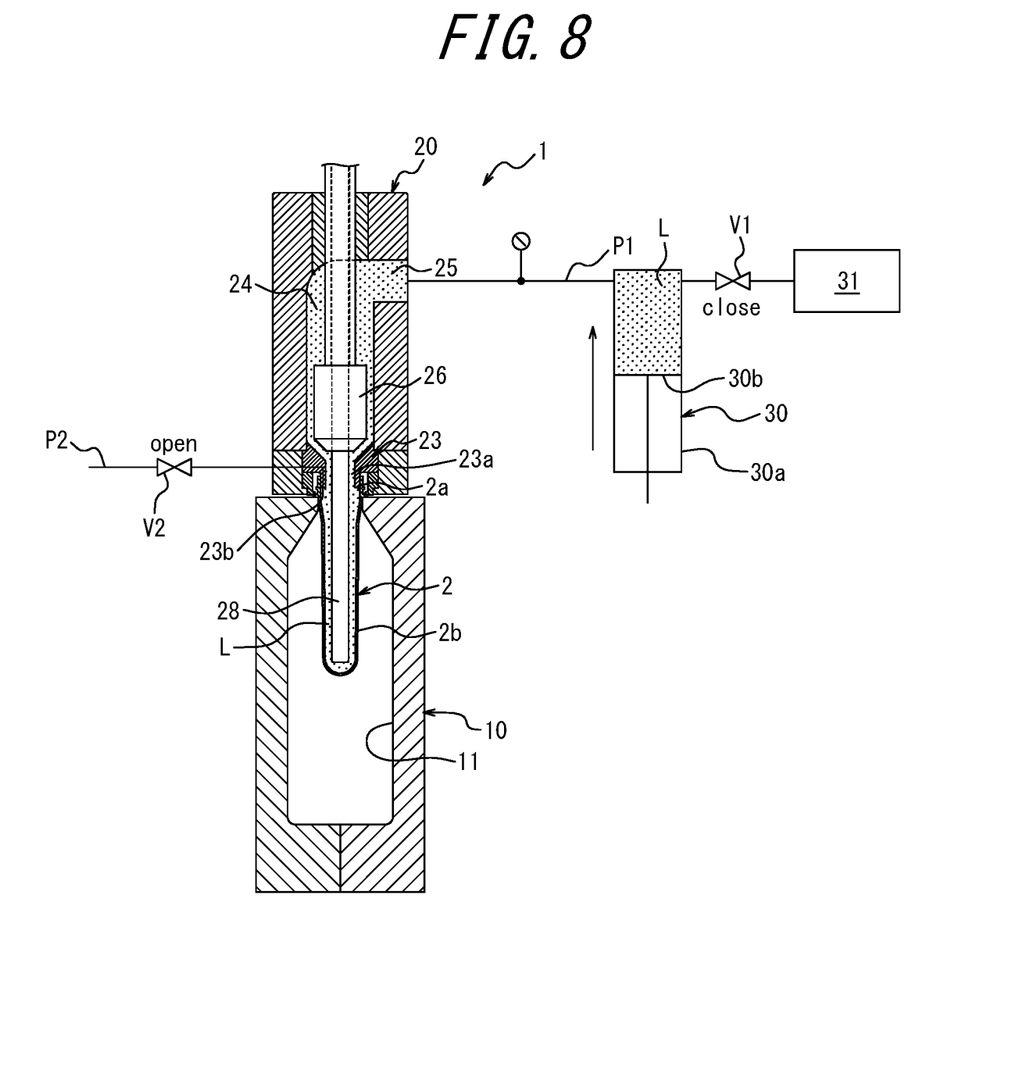
FIG. 8 is a diagram illustrating the liquid container manufacturing apparatus during the liquid replacing step performed to the preform into which a stretching rod is inserted, after the rod insertion step.

FIG. 7 is a diagram illustrating a liquid container manufacturing apparatus during the rod insertion step before the liquid replacing step, and FIG. 8 is a diagram illustrating the liquid container manufacturing apparatus that performs, after the rod insertion step, the liquid replacing step to a preform with a stretching rod inserted therein. Note that, in FIGS. 7 and 8, the members corresponding to the above described ones are assigned with the same reference signs.

In the liquid container manufacturing method according to the present embodiment, the rod insertion step of inserting a rod member into the preform 2 is performed before the liquid replacing step, and the liquid replacing step is performed to the preform 2 with the rod member inserted in the rod insertion step.

As a rod member to be inserted into the preform 2 in the rod insertion step, the stretching rod 28 configured to axially stretch the preform 2 in the rod stretching step may be used. FIGS. 7 and 8 illustrate the case where the stretching rod 28 is used as a rod member. In the case where the rod stretching step is not performed, for example, a rod member other than the stretching rod 28 may be used as a rod member to be inserted into the preform 2 in the rod insertion step.

As illustrated in FIG. 7, in the rod insertion step, the stretching rod 28 is moved downward to be inserted into the preform 2 after the nozzle fitting step and before the liquid replacing step. At this time, although it is preferable that the lower end of the stretching rod 28 does not come in contact with the internal bottom surface of the preform 2, the lower end of the stretching rod 28 may be brought in contact with the internal bottom surface of the preform 2 to a degree by which the preform 2 is not stretched. When the stretching rod 28 is inserted, an internal volume of the preform 2, that is, a volume in which the liquid L can be contained, is decreased by the volume of the stretching rod 28 inserted into the preform 2.

Note that, in the rod insertion step, before the nozzle fitting step is performed, the stretching rod 28 may be moved downward in advance and inserted into the preform 2 in the nozzle fitting step.

Subsequently, as illustrated in FIG. 8, the liquid replacing step is performed to the preform 2 with the stretching rod 28 inserted. In this case, the internal volume of the preform 2 is decreased by the volume of a portion of the stretching rod 28 inserted into the preform 2. Thus, compared with the case where the rod insertion step is not performed, a supply amount of liquid L required for replacing all of the air in the preform 2 with the liquid L and the time required for replacing all of the air in the preform 2 with the liquid L can be reduced.

Therefore, a degree to which the preform 2, which has been heated in advance to a predetermined temperature (e.g. from 80° C. to 150° C.) around which stretchability is achieved when placed in the mold for blow molding 10, is cooled in the liquid replacing step is decreased, and the preform 2 can be molded into a liquid container C more precisely in the liquid blow molding step.

In the rod insertion step, it is preferable that the stretching rod 28 is inserted into the preform 2 until it occupies 30% to 70% of the internal volume of the preform 2. When the stretching rod 28 is inserted into the preform 2 until it occupies only less than 30% of the internal volume of the preform 2, the supply amount or the time required for replacing all of the air inside the preform 2 with a liquid cannot be reduced sufficiently, and the above described effect cannot be obtained sufficiently. On the other hand, when the stretching rod 28 is inserted into the preform 2 until it occupies more than 70% of the internal volume of the preform 2, it is likely that the stretching rod 28 may come in contact with the inner surface of the preform 2 in the rod stretching step, for example, and the preform 2 may be damaged. Further, when the stretching rod 28 is inserted into the preform 2 until it occupies more than 70% of the internal volume of the preform 2, the space between the inner surface of the preform 2 and the outer periphery of the stretching rod 28 is narrowed, and when shampoo, rinse, liquid soap or the like having a relatively high viscosity are used as the liquid L, the air inside the preform 2 may not be released easily to the outside, which may not allow sufficient replacement of the air inside the preform 2 with the liquid L.

The inventors performed an experiment where water at room temperature was used as the liquid L to be supplied into the preform 2 in the liquid replacing step, and confirmed that: when the stretching rod 28 was inserted into the preform 2 until it occupies 19% of the internal volume of the preform 2, the preform 2 was cooled and the above described effect could not be obtained sufficiently; when the stretching rod 28 was inserted into the preform 2 until it occupies 34% of the internal volume of the preform 2, and when the stretching rod 28 was inserted into the preform 2 until it occupies 60% of the internal volume of the preform 2, the above described effect could be obtained sufficiently; and when the stretching rod 28 was inserted into the preform 2 until it occupies 70.5% of the internal volume of the preform 2, the stretching rod 28 occasionally came in contact with the inner surface of the preform 2 in the rod stretching step and damaged the inner surface of the preform 2.

In this manner, in the rod insertion step, when the stretching rod 28 is inserted into the preform 2 until it occupies 30% to 70% of the internal volume of the preform 2, the air inside the preform 2 is reliably replaced with the liquid L without damaging the inner surface of the preform 2 or without excessively cooling the preform 2 in the liquid replacing step, and as a result the preform 2 can be molded into a liquid container C more precisely in the liquid blow molding step.

In the cases illustrated in FIGS. 7 and 8, the stretching rod 28 is stored inside the blow nozzle 23 before the rod insertion step, and from this state the stretching rod 28 is moved downward to be inserted into the preform 2. However, this is not restrictive, and the length of the stretching rod 28 may be determined so that the stretching rod 28 already protrudes downward from the blow nozzle 23 when it is located at its original position (before the nozzle fitting step), and when the nozzle fitting step is finished, the portion that protrudes downward from the blow nozzle 23 of the stretching rod 28 may be inserted into the preform 2. In this case, the proportion of the stretching rod 28 to the internal volume of the preform 2 can be changed appropriately by making the diameter of the portion that protrudes downward from the blow nozzle 23 of the stretching rod 28 larger than the portion above the portion that protrudes downward.

Figure 9:
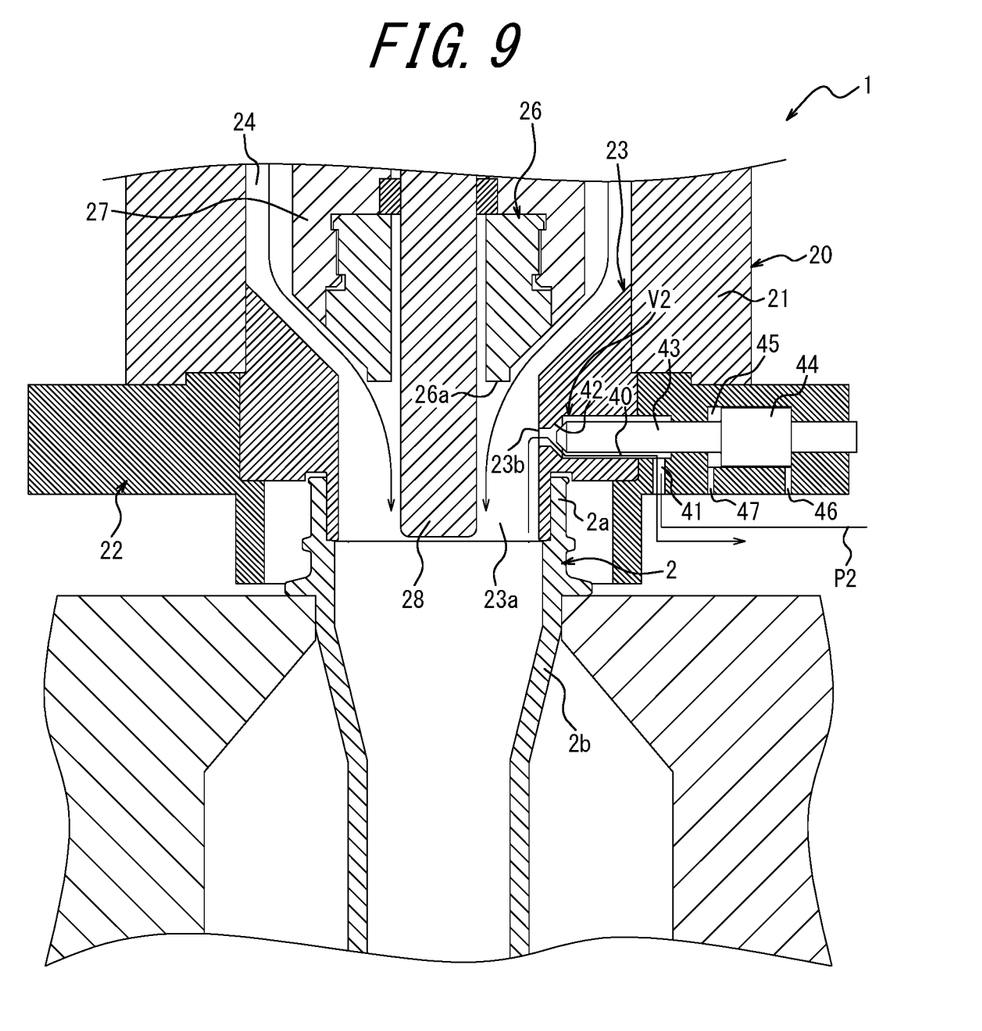
FIG. 9 is a cross-sectional view of the main part of the nozzle unit according to a variation during the liquid replacing step.

FIG. 9 is a cross-sectional view of a main part of a nozzle unit according to a variation during the liquid replacing step. In FIG. 9, the members corresponding to the above described ones are assigned with the same reference signs.

In the liquid container manufacturing apparatus 1 illustrated in FIGS. 1 and 2, the opening-closing valve V2 configured to communicate the discharge port 23b with the discharge tank during the liquid replacing step is provided to a pipe P2 connected to the connection port 22a of the support block 22. However, the opening-closing valve V2 may be provided in the blow nozzle 23 as in the case of the nozzle unit 20 according to the variation illustrated in FIG. 9.

In the variation illustrated in FIG. 9, the discharge port 23b is provided such that it opens to the inner periphery of the blow nozzle 23 and is connected to a discharge tank (not illustrated) through a linear flow channel 40 formed across the blow nozzle 23 and the support block 22, a connection port 41 communicated with the flow channel 40 in a direction orthogonal to the flow channel 40 and the pipe P2 connected to the connection port 41. Note that the discharge port 23b may be opened to the outside without being connected to the discharge tank.

A portion formed inside the blow nozzle 23 of the flow channel 40 is provided with a tapered seal surface 42 with a diameter that increases as it is away from the discharge port 23b. Further, inside the flow channel 40 is provided with a seal pin 43 that has a tapered tip portion corresponding to the seal surface 42 and a diameter smaller than that of the flow channel 40. The seal pin 43 is supported by the support block 22 along the shaft center of the flow channel 40 and is disposed movably forward and backward along the axial direction. Further, the opening-closing valve V2 is formed by the seal surface 42 and the tapered tip portion of the seal pin 43.

The seal pin 43 is integrally provided with a piston 44 with a diameter larger than that of the seal pin 43. The piston 44 is provided inside the cylinder chamber 45 provided to the support block 22, and is movable along the axial direction in the cylinder chamber 45. The support block 22 is provided with a close-side port 46 communicating with the back end side remote from the discharge port 23b in the cylinder chamber 45 and an open-side port 47 communicating with the front end portion near the discharge port 23b in the cylinder chamber 45.

When a pressurized medium such as compressed air is supplied from the close-side port 46 into the cylinder chamber 45, the piston 44 is moved forward to the side of the discharge port 23b and the tip portion of the seal pin 43 comes in contact with the seal surface 42. In this manner the opening-closing valve V2 is closed. On the contrary, when a pressurized medium such as compressed air is supplied from the open-side port 47 into the cylinder chamber 45, the piston 44 is moved backward to the direction remote from the discharge port 23b and the tip of the seal pin 43 is separated from the seal surface 42. In this manner the opening-closing valve V2 is opened. Note that the seal pin 43 may be opened/closed by using the other mechanical (electrical) actuators such as solenoids.

During the normal time when the liquid replacing step is not performed, a pressurized medium is supplied to the close-side port 46 and the opening-closing valve V2 is closed, which causes the discharge port 23b to be in a closed state in which communication thereof with the discharge tank is blocked.

On the other hand, as illustrated in FIG. 9, when the liquid replacing step is performed, a pressurized medium is supplied to the open-side port 47 and the opening-closing valve V2 is opened, which causes the discharge port 23b to be in an open state in which the discharge port communicates with the discharge tank. Further, the seal body 26 is moved upward with the discharge port 23b open to open the liquid supply port 23a, and in that state the pressurized liquid supply source 30 is operated in the positive direction. In this manner the air in the preform 2 is discharged through the discharge port 23b to the outside while the liquid L is supplied into the preform 2, and thus the air inside the preform 2 can be replaced with the liquid L.

In this manner, when the opening-closing valve V2 is provided inside the blow nozzle 23, compared with the case where the opening-closing valve V2 is provided to the pipe P2 connected outside the nozzle unit 20, a length of the flow channel between the discharge port 23b and the opening-closing valve V2 can be reduced. Therefore, the amount of the liquid L entered into the flow channel 40 in the liquid replacing step and the liquid blow molding step can be reduced.

As illustrated in FIG. 9, in this variation, it is preferable that a cylindrical protrusion 26a with a diameter smaller than that of the inner periphery of the blow nozzle 23 is provided to the lower end of the seal body 26. By providing the protrusion 26a, when the liquid supply port 23a is opened to supply the liquid L into the preform 2 in the liquid replacing step, the liquid L flows from the outer periphery of the seal body 26 along the protrusion 26*a* and is guided to the shaft center side of the liquid supply port 23*a*, and in this manner the liquid L does not easily enter into the discharge port 23*b*.

In the variation illustrated in FIG. 9, a longitudinal groove extending from the discharge port 23*b* to the lower end of the blow nozzle 23 can be provided on the inner periphery of the blow nozzle 23. Further, separately from the above described longitudinal groove, a plurality of longitudinal grooves can be circumferentially provided side by side at intervals on the inner periphery of the blow nozzle 23. In this case, a circumferential groove that is continuous with the discharge port 23*b* and connects the upper ends of longitudinal grooves each other may be provided on the inner periphery of the blow nozzle 23.

The opening-closing valve V2 illustrated in FIG. 9 may be provided to the nozzle unit 20 illustrated in FIGS. 1 and 2.

Needless to say, the present disclosure is not limited to the above described embodiment, and various changes may be made without departing from the spirit of the present disclosure.

For example, in the above described embodiment, although the disclosed liquid container manufacturing method is performed by using the liquid container manufacturing apparatus 1 illustrated in FIG. 1, the disclosed liquid container manufacturing method may be performed by using the liquid container manufacturing apparatus or the like having the other configuration.

In the above described embodiment, although the rod stretching step and the rod pulling step are performed by using the liquid container manufacturing apparatus 1 provided with the stretching rod 28, these steps may not be performed. In that case, the liquid container manufacturing apparatus 1 provided with no stretching rod 28 may be used.

Furthermore, in the above described embodiment, although the pressurized liquid supply source 30 is a plunger pump, it is not limited thereto, and a variety of pumps such as the other types of pumps may be used as far as they can pressurize the liquid L to a predetermined pressure and supply it to the preform 2.

As the preform 2, one having a variety of shapes corresponding to the shape and the like of the liquid container C after molding may be used.

Furthermore, in the above described embodiment, although the rod stretching step is performed during the liquid blow molding step, it may be performed before the liquid blow molding step.

REFERENCE SIGNS LIST

1 liquid container manufacturing apparatus
2 preform
2*q* mouth
2*b* barrel portion
10 mold for blow molding
11 cavity
20 nozzle unit
21 body block
22 support block
22*a* connection port
23 blow nozzle
23*a* liquid supply port
23*b* discharge port
23*c* flow channel
23*d* connection channel
24 supply channel
25 supply port
26 seal body
26*a* protrusion
27 shaft body
28 stretching rod (rod member)
30 pressurized liquid supply source
30*a* cylinder
30*b* piston
31 supply tank
32 pressure gauge
40 flow channel
41 connection port
42 seal surface
43 seal pin
44 piston
45 cylinder chamber
46 close-side port
47 open-side port
L liquid
P1 pipe
V1 opening-closing valve
P2 pipe
V2 opening-closing valve
C liquid container

The invention claimed is:

1. A container manufacturing method of manufacturing a liquid container containing a content liquid from a synthetic resin preform, the method comprising:
    a nozzle fitting step of fitting a blow nozzle into a mouth of the preform placed in a mold for blow molding;
    a liquid replacing step of replacing air in the preform with a liquid by supplying a predetermined amount of liquid into the preform at a pressure at which the preform is not liquid blow molded and from a liquid supply port provided to the blow nozzle separately from a discharge port with the discharge port provided to the blow nozzle open; and
    a liquid blow molding step of molding the preform into a liquid container having a shape conforming to an inner surface of the mold for blow molding by supplying a pressurized liquid from the liquid supply port into the preform after the discharge port is closed.

2. The liquid container manufacturing method according to claim 1, wherein, in the liquid replacing step, the predetermined amount of liquid is supplied into the preform at a pressure lower than that of the liquid blow molding step.

3. The liquid container manufacturing method according to claim 1, comprising:
    a rod stretching step of axially stretching the preform by a stretching rod before the liquid blow molding step or during the liquid blow molding step; and
    a rod pulling step of separating the stretching rod from the liquid container after the liquid blow molding step.

4. The liquid container manufacturing method according to claim 1, further comprising:
    a liquid discharging step of discharging a second predetermined amount of liquid from the liquid container after molding through the liquid supply port after the liquid blow molding step; and
    a headspace forming step of forming a predetermined amount of headspace in the liquid container by separating the blow nozzle from the mouth of the liquid container after the second predetermined amount of liquid is discharged from the liquid container.

5. The liquid container manufacturing method according to claim 4, wherein the liquid discharging step is performed by sucking back the second predetermined amount of liquid from the liquid container after molding through the liquid supply port.

6. The liquid container manufacturing method according to claim 1, comprising a rod insertion step of inserting a rod member into the preform before the liquid replacing step, wherein the liquid replacing step is performed to the preform into which the rod member is inserted in the rod insertion step.

7. The liquid container manufacturing method according to claim 6, wherein, in the rod insertion step, the rod member is inserted into the preform until it occupies 30% to 70% of an internal volume of the preform.

8. The liquid container manufacturing method according to claim 6, wherein the rod member is a stretching rod that axially stretches the preform.

9. The liquid container manufacturing method according to claim 1, wherein, by adjusting an opening of a seal body that opens/closes the liquid supply port, an effective cross-sectional area of the liquid supply port when a liquid is supplied into the preform in the liquid replacing step is determined to be 10% or less of an effective cross-sectional area of the liquid supply port when a pressurized liquid is supplied into the preform in the liquid blow molding step.

* * * * *